United States Patent
Hirunuma et al.

[19]

[11] Patent Number: 6,057,963
[45] Date of Patent: *May 2, 2000

[54] BINOCULAR HAVING HAND-VIBRATION COMPENSATION SYSTEM

[75] Inventors: Ken Hirunuma, Tokyo; Shinji Tsukamoto, Saitama-ken; Moriyasu Kanai, Tokyo, all of Japan

[73] Assignee: Asahi Kogaku Kogyo Kabushiki Kaisha, Tokyo, Japan

[ * ] Notice: This patent is subject to a terminal disclaimer.

[21] Appl. No.: 09/203,524

[22] Filed: Dec. 1, 1998

[30] Foreign Application Priority Data

Dec. 2, 1997 [JP] Japan .................................. 9-331738

[51] Int. Cl.[7] .................................................. G02B 27/64
[52] U.S. Cl. .......................... 359/557; 359/554; 396/52; 396/55
[58] Field of Search ..................... 359/407–420, 359/480–482, 554–557, 813–814, 823–824, 431, 831–837; 396/52–55; 348/208

[56] References Cited

U.S. PATENT DOCUMENTS

| | | | |
|---|---|---|---|
| 4,013,339 | 3/1977 | Ando et al. .............................. | 359/556 |
| 5,231,534 | 7/1993 | Kato ........................................ | 359/432 |
| 5,280,387 | 1/1994 | Maruyama ............................... | 359/554 |
| 5,387,999 | 2/1995 | Hayashi ................................... | 359/557 |
| 5,461,513 | 10/1995 | Maruyama ............................... | 359/837 |
| 5,754,339 | 5/1998 | Kanai et al. ............................. | 359/557 |
| 5,768,016 | 6/1998 | Kanbara ................................... | 359/557 |
| 5,917,653 | 6/1999 | Taniguchi ................................ | 359/557 |

FOREIGN PATENT DOCUMENTS

| | | |
|---|---|---|
| 2-81009 | 3/1990 | Japan . |
| 2284113 | 11/1990 | Japan . |
| 3237438 | 10/1991 | Japan . |
| 6-43365 | 2/1994 | Japan . |
| 7248522 | 9/1995 | Japan . |
| 7311368 | 11/1995 | Japan . |

*Primary Examiner*—Thong Nguyen
*Attorney, Agent, or Firm*—Greenblum & Bernstein, P.L.C.

[57] ABSTRACT

A binocular is provided with a hand-vibration compensation system. The hand-vibration compensation system includes an arm member which rotatable about a rotation axis extending in parallel with the optical axes of the pair of telescopic optical systems of the binocular. Compensation lenses for shifting images are held at the end portions of the arm. It should be noted that the rotation axis of the arm is located between the optical axes of the pair of telescopic optical systems, and more importantly, the arm is substantially equally balanced at the rotation axis thereof. The arm is driven to rotate about the rotation axis by an actuator in accordance with a hand-vibration applied to the binocular.

6 Claims, 9 Drawing Sheets

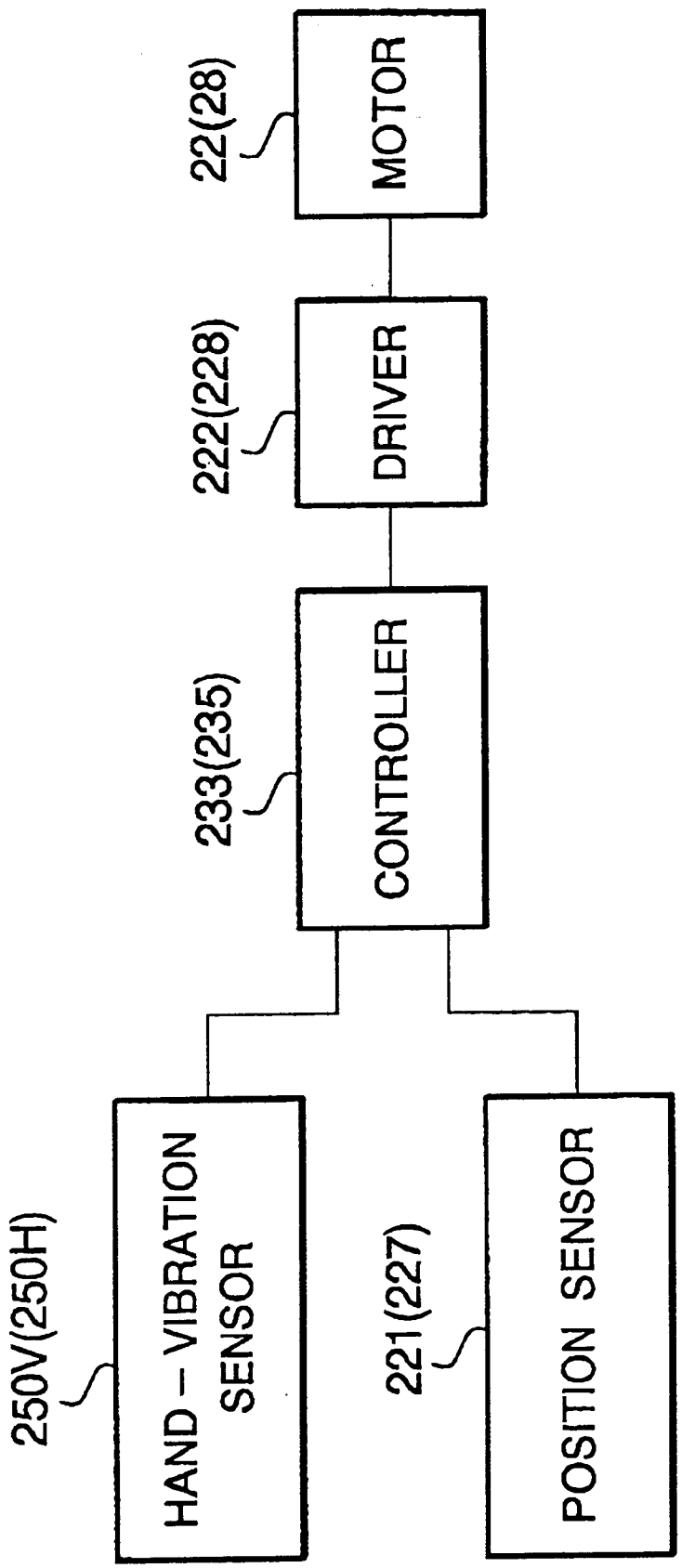

BINOCULAR HAVING HAND-VIBRATION COMPENSATION SYSTEM

BACKGROUND OF THE INVENTION

The present invention relates to a binocular having a hand-vibration compensation system.

Recently, binoculars provided with hand-vibration compensation systems for compensating trembling of image due to the hand-vibration have been developed. The conventional hand-vibration compensation system for a binocular includes a variable angle prism which is controlled to change the angle so that trembling of image is cancelled. Such a compensation system is, howver, relatively difficult to manufacure and to control.

In a field of cameras, a hand-vibration compensation optical system including compensation lens, which is to be moved within an optical path has been suggested. If such a compensation system is employed in a binocular, a pair compensation lenses are moved in a direction perpendicular to the optical axis of each telescopic optical system. In such a type of the compensation system, two compensation mechanisms should be provided, which are:

(1) a mechanism for moving the compensation lenses in a vertical direction; and
(2) a mechanism for moving compensation lenses, which are also provided within the optical paths of the telescopic optical systems, in a horizontal direction.

For the mechanism which moves the lenses in the vertical direction, it is necessary to change a response speed and/or voltage or electrical current for an actuator, depending on whether the lenses are moved in a direction of the gravity or in the opposite direction. In other words, controlling of the mechanism for moving the lenses should be changed when the lenses are moved in the vertical direction, and accordingly controlling is relatively complicated. Further, such a mechanism is required to have a driving device which has a relatively large torque in order to move the structure with resisting the gravity, and a relatively large battery for supplying sufficient power to such a driving device. Therefore, the compensation mechanism becomes relatively large.

SUMMARY OF THE INVENTION

It is therefore an object of the present invention to provide a binocular having a hand-vibration compensation system which is free from affection of the gravity, and is capable of compensating trembling of an image due to the hand-vibration with a relatively simple structure and control.

For the above object, according to the invention, there is provided a binocular having a hand-vibration compensation system for compensating trembling of images due to a hand-vibration applied to the binocular. The binocular is provided with: a pair of telescopic optical systems; first and second compensation optical systems respectively provided in the pair of telescopic optical systems, optical axes of the pair of telescopic optical systems intersect the first and second compensation optical systems, respectively. The binocular further includes an arm rotatable about a rotation axis extending in parallel with the optical axes of the pair of telescopic optical systems. At least one optical element included in each of the first and second compensation optical systems is held at each end of the arm. It should be noted that the rotation axis is located between the optical axes of the pair of telescopic optical systems, and more importantly, the arm is substantially equally balanced at the rotation axis thereof. The arm is driven to rotate about the rotation axis by an actuator in accordance with a hand-vibration applied to the binocular.

In particular, when the at least one optical element included in the first compensation optical system is moved by a predetermined amount, image is shifted by an amount $K1$, and when the at least one optical element included in said second compensation optical system is moved by the predetermined amount, image is shifted by an amount $K2$, and a distance $L1$ between a center of the at least one optical element of the first compensation optical system and the rotation axis, and a distance $L2$ between a center of the at least one optical element of the second compensation optical system and the rotation axis satisfy the following relationship:

$$|K1/K2|=|L2/L1|.$$

In one case, the amount $K1$ is equal to the amount $K2$, and the optical elements of first and second compensation optical systems have substantially the same weight.

In another case, the amount $K1$ is equal to the amount $K2$, the optical elements of first and second compensation optical systems have different weights, and the arm member is provided with a balancer for making the arm member to be substantially equally balanced at the rotation axis.

In another case, the amount $K1$ may be different from the amount $K2$. In this case, $L1$ is different from $L2$, and accordingly, the rotation axis is not located at the center between the optical axes of the telescopic optical systems.

If the arm is not equally balanced at the rotation axis in the above case, the arm member is provided with a balancer for making the arm member to be substantially equally balanced at the rotation axis.

DESCRIPTION OF THE ACCOMPANYING DRAWINGS

FIG. 3 shows a block diagram illustrating a control system for driving the hand-vibration compensation mechanisms;

DESCRIPTION OF THE EMBODIMENTS

Hereinafter, embodiments of the present invention will be described with reference to the accompanying drawings.

First Embodiment

Figure 1:
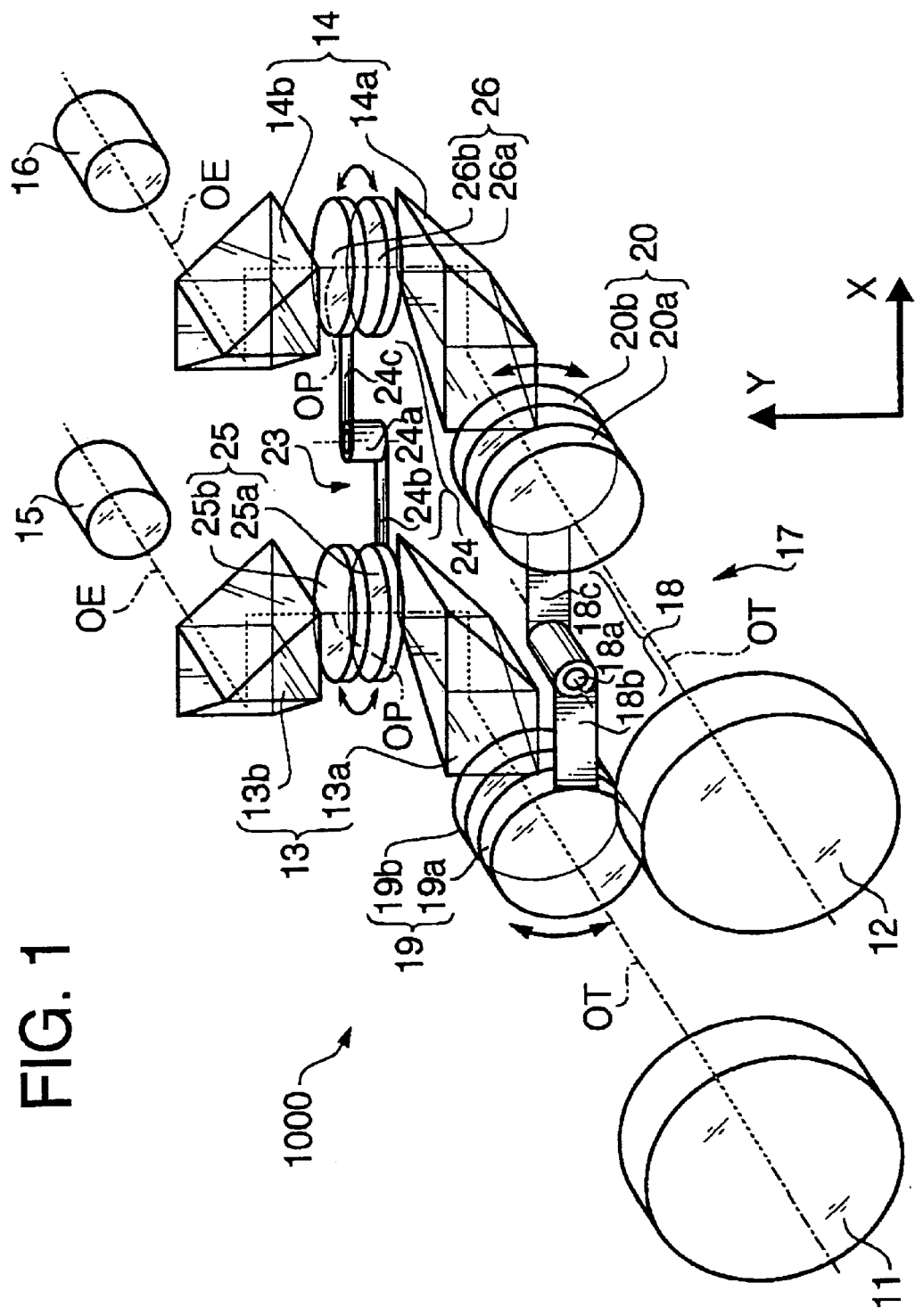
FIG. 1 is a perspective view of an optical system showing arrangement of optical elements of a binocular according to a first embodiment of the invention.

FIG. 1 shows an optical system of a binocular 1000 according to a first embodiment of the invention. The binocular 1000 is provided with a pair of telescopic optical systems for right and left eyes of a user. It should be noted that, in the accompanying drawings, an X-Y axis system is indicated to clarify the direction referred to. The Y axis corresponds to the up/down direction of the user when the binocular is held horizontally by the user, and the X axis corresponds to the right/left direction of the user of the binocular when the binocular is held horizontally.

Figure 9:
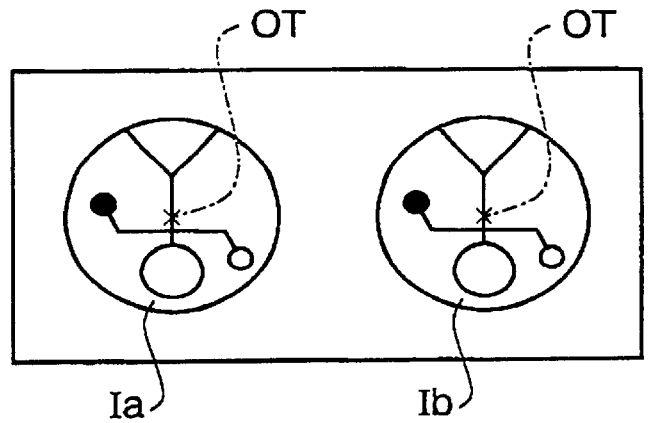
FIG. 9 shows orientation of the images at a position between the objective lens and the erecting optical system.

At a front end of the telescopic optical system for the right eye (on the left-hand side in FIG. 1), a right objective lens 11 is provided, and at a front end of the telescopic optical system for the left eye (on the right-hand side in FIG. 1), a left objective lens 12 is provided. Behind each of the right objective lens 11 and the left objective lens 12, erecting optical systems 13 and 14, each of which has four reflection surfaces, are provided. The objective lenses 11 and 12 respectively form reversed images Ia and Ib, an example of such images are illustrated in FIG. 9.

The erecting optical system 13 included in the right eye telescopic optical system has first and second sub prisms 13a and 13b, which are arranged in a direction perpendicular to a plane including both of the optical axes OT of the right and left eye telescopic optical systems (i.e., arranged in the Y direction). Specifically, the sub prisms 13a and 13b are formed by dividing a type II Porro prism into two separate elements. Each of the sub prisms 13a and 13b has two reflection surfaces.

Figure 10:
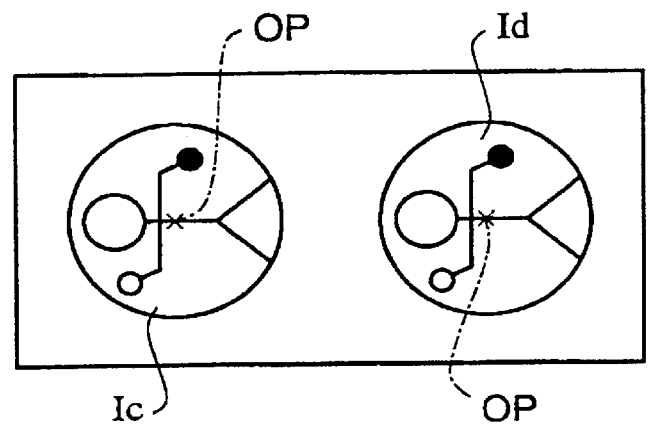
FIG. 10 shows orientation of the images at a position between the first and second sub prisms.

The first sub prism 13a is arranged so as to form a rotated image Ic (see FIG. 10) which is rotated, with respect to the reversed image Ia, by 90 degrees in a clockwise direction viewed from the objective lens side. The light reflected inside the first sub prism 13a is then incident on the second sub prism 13b in which the light is reflected by the two reflection surfaces so that the erected image becomes observable through the right eyepiece lens 15.

Similar to the erecting optical system 13, the left eye erecting optical system 14 includes a first and second sub prisms 14a and 14b which are formed by dividing the type II Porro prism. It should be noted that orientation of the sub prisms 13a and 14a is similar, and orientation of the sub prisms 13b and 14b is similar. In other words, if the sub prisms 13a and 13b are shifted to the sub prisms 14a and 14b, they overlap.

With this structure, the second sub prism 14a rotates the reversed image Ib to form a rotated image Id (see FIG. 10), which is rotated, with respect to the reversed image Ib, by 90 degrees in a clockwise direction. The light reflected inside the first sub prism 14a is then incident on the second sub prism 14b in which the light is reflected by the two reflection surfaces so that the erected image becomes observable through the left eyepiece lens 16.

It should be noted that, although the objective lenses and eyepiece lenses are described as a single lens in the embodiments, each of the lenses may include a plurality of groups and/or a plurality of lenses.

The optical axis of the right (or left) eye telescopic optical system includes the optical axis OT which extends from the objective lens 11 (or 12) to the erecting optical system 13 (or 14), an optical axis OP defined between the first and second sub prisms 13a and 13b (or 14a and 14b), and an optical axis OE extending from the erecting optical system 13 (or 14) to the eyepiece lens 15 (or 16). The axes OT and OE are parallel, and the axis OP is perpendicular to the axes OT and OE.

Figure 2A:
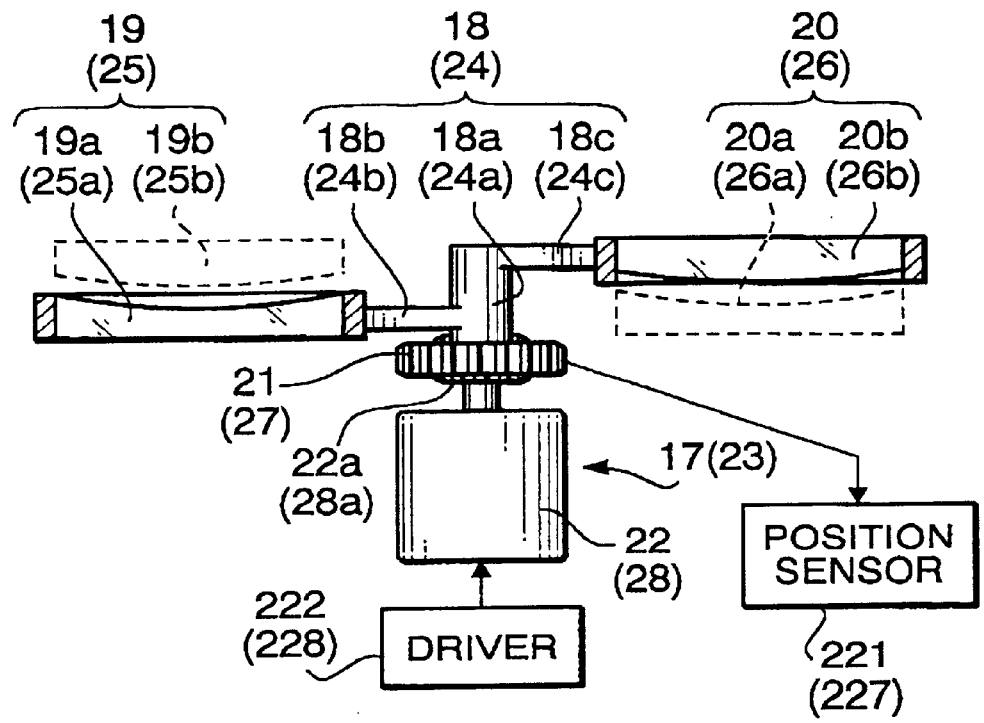
FIG. 2A shows a schematic structure of a hand-vibration compensation mechanism viewed in a direction perpendicular to the optical axis of the binocular shown in FIG. 1.
Figure 2B:
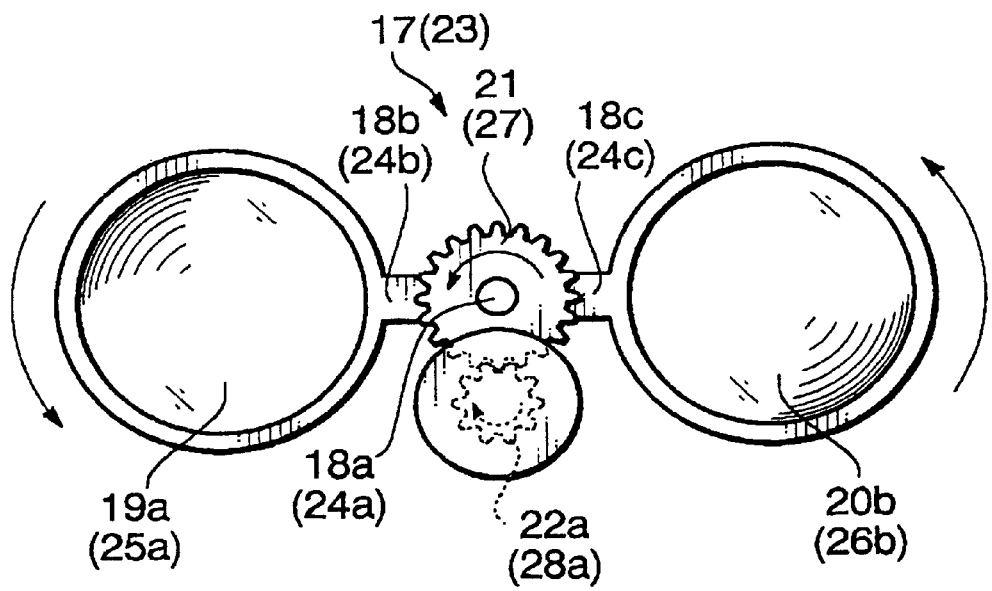
FIG. 2B shows a schematic structure of the hand-vibration compensation mechanism viewed in a direction parallel to the optical axis shown in FIG. 1.

In the binocular 1000 according to the first embodiment, between the objective lens (11 or 12) and the first sub prism (13a or 14a), an up/down hand vibration compensation mechanism 17 (hereinafter referred to as the up/down compensation mechanism) is provided. The up/down compensation mechanism 17 includes a rotatable arm 18. The rotatable arm 18 holds the right and left compensation lenses. The rotation axis 18a of the rotatable arm 18 is located at the center of the both of the optical axes OT of the right and left telescopic optical systems, and extends in parallel to the optical axes OT. In the direction perpendicular to the rotation axis 18a (i.e., in the X-axis direction in FIG. 1), a right compensation lens frame 18b and a left compensation lens frame 18c extend in opposite directions. The right and left compensation lenses 19 and 20 are arranged such that the optical axes OT intersect the right and left compensation lenses 19 and 20. As shown in FIGS. 2A and 2B, the right compensation lens 19 includes a negative lens 19a and a positive lens 19b, which are arranged along the optical axis OT of the right eye telescopic optical system, and the left compensation lens 20 includes a negative lens 20a and a positive lens 20b, which are arranged along the optical axis OT of the right eye telescopic optical system.

The right compensation lens frame 18b holds the negative lens 19a, and the left compensation lens frame 18c holds the positive lens 20b. Therefore, the right compensation lens frame 18b and the left compensation lens frame 18c are apart by a predetermined amount along the optical axes OT.

The negative lenses 19a and 20a are the same lenses, and the positive lenses 19b and 20b are the same lenses. Further, the lenses 19a and 20b are formed such that, when these lenses are decentered (i.e., the optical axis of the lenses 19a and 20b are moved in a direction perpendicular to the optical axes OT), the optical paths of light passed through the lenses 19a and 20b shift by the same amount but in the opposite directions. The positive lens 19b and the negative lens 20a, which are not held by the rotatable arm 18, are arranged such that the optical axes thereof coincide with the optical axes OT, respectively.

To the front end (i.e., the object side end) of the shaft 18a, a driving gear 21 is secured, with which a pinion gear 22a of a motor 22 is engaged. The motor 22 is driven to rotate in either direction such that the pinion gear 22a is rotated in a forward or reverse direction. As shown in FIG. 2B, when the pinion gear 22a is rotated in the clockwise direction in the drawing, the arm 18 is driven to rotate in the counterclockwise direction about the shaft 18a via the driving gear 21. When the pinion gear 22a is rotated in the counterclockwise direction in the drawing, the arm 18 is rotated in the clockwise direction.

As described above, by rotating the arm 18 with the motor 22, the negative lens 19a and the positive lens 20b which are arranged on the opposite positions with respect to the shaft 18a can be displaced in opposite directions within a plane perpendicular to the optical axes OT and OT of the telescopic optical systems. Since each of the negative lens 19a and the positive lens 20b moves along an arc whose center is the central axis of the shaft 18a, when displaced, the negative lens 19a and the positive lens 20b are displaced in the right/left direction (i.e., in the X-axis direction in FIG. 1) as well as in the up/down direction (i.e., in the Y-axis direction in FIG. 1). However, the amount of displacement in the right/left direction is small and can be ignored. Thus, the negative lens 19a and the positive lens 20b are moved mainly in the up/down direction when the rotatable arm 18 is rotated.

It should be noted that when the rotatable arm 18 is rotated, the negative lens 19a and the positive lens 20b are moved in the opposite directions with respect to the reversed images Ia and Ib. However, as described above, the positions of the reversed images Ia and Ib are shifted in the same direction.

As shown in FIG. 2A, a position sensor 221 is provided to detect a rotational position of the arm 18 with respect to its initial position. It should be noted that, the optical axes of the lenses 19a and 20b coincide with the optical axes OT when positioned at the initial position.

Further, as shown in FIG. 3, the up/down compensation mechanism is provided with a hand-vibration sensor 250V for detecting the hand-vibration of a component in the up/down direction (i.e., Y-axis direction in FIG. 1). Output signals of the hand-vibration sensor 250V and the position sensor 221 are input to a controller 233. The controller 233 calculates amount of movement in the up/down direction due to the hand-vibration, and controls a driver 222 to drive the motor 22 by an amount corresponding to the amount of movement due to the hand-vibration. Specifically, the controller 233 determines a target position to which the arm 18 is to be positioned for canceling change of the position of the image due to the hand-vibration based on the amount of movement detected by the hand-vibration sensor. Then, the controller 233 controls the driver to move the arm to the calculated target position with monitoring the position detected by the position sensor. As the above control is continuously executed, the controller 233 continuously updates the target position, and accordingly, trembling of the images due to the hand-vibration in the up/down direction can be compensated.

The right/left compensation mechanism 23 is arranged between the first sub prisms 13a and 14a, and the second sub prisms 13b and 14b. As shown in FIG. 1, the right/left compensation mechanism 23 is inserted in the optical axes OP defined between the first and second sub prisms. As shown in FIGS. 2A and 2B, the right/left compensation mechanism 23 has the same structure as the up/down compensation mechanism 17. The right/left compensation mechanism 23 includes a rotatable arm 24 which is located between the right and left optical axes OP and extends in a direction parallel to the optical axes OP. The rotatable arm 24 is made rotatable about a shaft 24a. The rotatable arm 24 has a right compensation lens holding frame 24b and a left compensation lens holding frame 24c.

The right/left compensation mechanism 23 includes right and left compensation optical systems 25 and 26, each of which includes a negative lens 25a (26a) and a positive lens 25b (26b) which are arranged along the optical axis OP. The negative lens 25a and the positive lens 26b are held by the right compensation lens holding frame 24b and the left compensation lens holding frame 24c, respectively. The positive lens 25b and the negative lens 26a, which are not held by the lens holding frames 24b and 24c are fixed inside the binocular such that the optical axes thereof coincide with the optical axes OP and OP, respectively.

To the front end of the shaft 24a, a driving gear 27 is secured, with which a pinion gear 28a of a motor 28 is engaged. The motor 28 is driven to rotate in either direction such that the pinion gear 28a is rotated in a forward or reverse direction. As the pinion gear 28a is rotated, the arm 24 is rotated.

The optical axis OP defined between the first sub prism 13a (14a) and the second sub prism 13b (14b) is an axis which extends in a direction perpendicular to a plane including the optical axes OT of the objective lens systems (i.e., in the Y-axis direction). Accordingly, the rotation arm 24 is arranged such that the shaft 24a extends perpendicular to the shaft 18a of the rotatable arm 18. With this construction, in the compensation mechanism 23, the negative lens 25a and the positive lens 26b are rotatable within a plane perpendicular to the optical axes OP and OP. In other words, the same mechanism is used for the right/left compensation mechanism 23 and for the up/down compensation mechanism 17 only by changing the direction of the shaft.

It should be noted that at the position where the right/left compensation mechanism 23 is provided, the images Ic and Id have been rotated by 90 degrees, with respect to the images Ia and Ib, by the first sub prisms 13 and 14, respectively. Therefore, by rotating the rotatable arm 24, trembling of the observed image due to the hand vibration in the right/left direction of the images Ic and Id can be compensated. The negative lens 25a and the positive lens 26b move in the opposite directions. However, since the two lenses 25a and 26b are negative and positive lenses, the compensation is made in the same direction. Thus, by rotating the rotatable arm 24, the trembling of the images due to the hand vibration applied to the binocular in the right/left direction is compensated.

As shown in FIG. 2A, a position sensor 227 is provided to detect a rotational position of the arm 24 with respect to the initial position.

Further, as shown in FIG. 3, the right/left compensation mechanism is provided with a hand-vibration sensor 250H for detecting the hand-vibration of a component in the right/left direction (i.e., X-axis direction in FIG. 1). Output signals of the hand-vibration sensor 250H and the position sensor 227 are input to a controller 235. The controller 235 calculates amount of movement in the right/left direction due to the hand-vibration, and controls a driver 228 to drive the motor 28 by an amount corresponding to the amount of movement due to the hand-vibration. Specifically, the controller 235 determines a target position to which the arm 24 is to be positioned for canceling change of the position of the image due to the hand-vibration based on the amount of movement detected by the hand-vibration sensor 250H. Then, the controller 233 controls the driver 228 to move the arm 24 to the calculated target position with monitoring the position detected by the position sensor 227. As the above control is continuously executed, the controller 235 continuously updates the target position, and accordingly, trembling of the image due to the hand-vibration in the right/left direction can be compensated.

With the structure described, the advantage described below is achieved.

Firstly, the right/left compensation mechanism 23 is arranged such that the lenses 25a and 26b are moved within a plane perpendicular to a direction of the gravity when the binocular is held horizontally by the user. Accordingly, in this condition, driving of the arm 24 (i.e., movement of the lenses 25a and 26b) is not affected by the gravity. On the other hand, the up/down compensation mechanism 17 is arranged such that the lenses 19a and 20b rotate about the shaft 18a. In the embodiment, the weight of the lenses 19a and 20b are substantially the same, i.e., the rotation arm 18 is equally balanced at the shaft 18a. Accordingly, movement of the lenses 19a and 20b, i.e., rotation of the arm 18 will not be affected by the gravity even when the binocular is held horizontally by the user. Similarly, since the rotation arm 24 is also equally balanced at the shaft 24a, movement of the lenses 25a and 26b will not be affected by the gravity even if the binocular is not held horizontally.

Thus, the up/down compensation mechanism 17 and the right/left compensation mechanism 23 do not require a driving device having a relatively great torque for resisting the gravity force since the arms 18 and 24 are equally balanced at the shafts 18a and 24a, respectively. Since the torque of the driving device can be made small, power consumption of such driving device is relatively small, and therefore a battery can be made small. The present invention is directed to part of a binocular that includes hand-vibration sensors, sensors for detecting the position of the compensation lenses, and such elements have thus been shown generally in FIG. 3. However, the details of the hand-vibration sensors and/or position detection sensors do not form part of the invention. These are provided to assist in understanding of the invention, and any types of suitable hand-vibration sensors and/or position detecting sensors could be employed to control the up/down compensation mechanism and/or the right/left compensation mechanism.

Figure 12A:
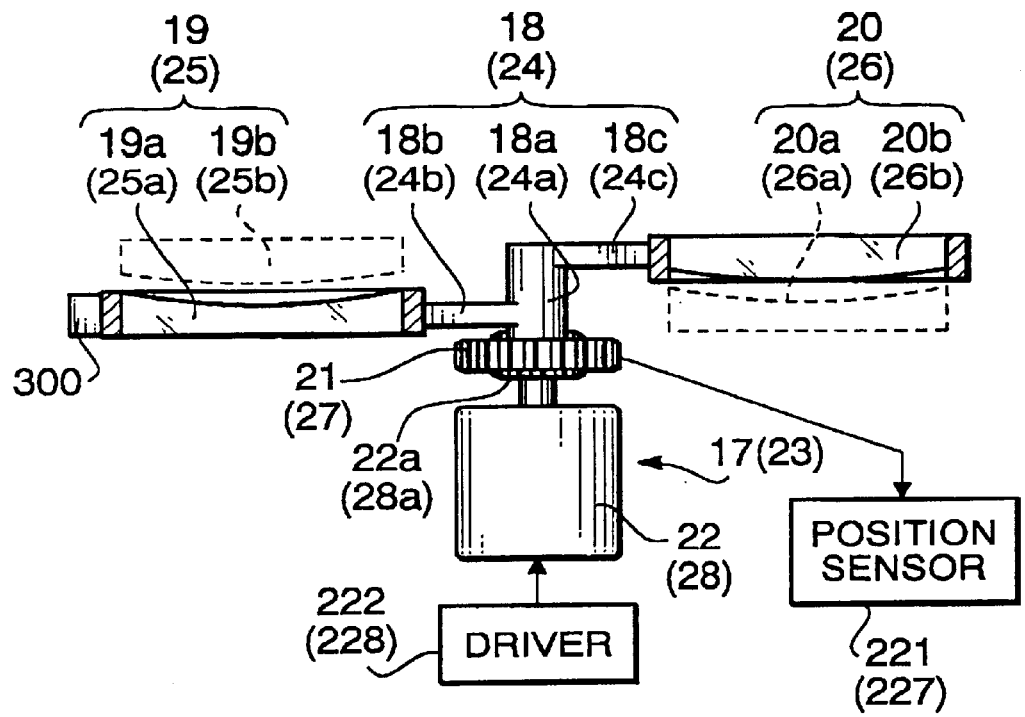
FIG. 12A is a top view of a schematic structure of a hand-vibration compensation mechanism similar to the mechanism shown in FIG. 2A and provided with a balancer.
Figure 12B:
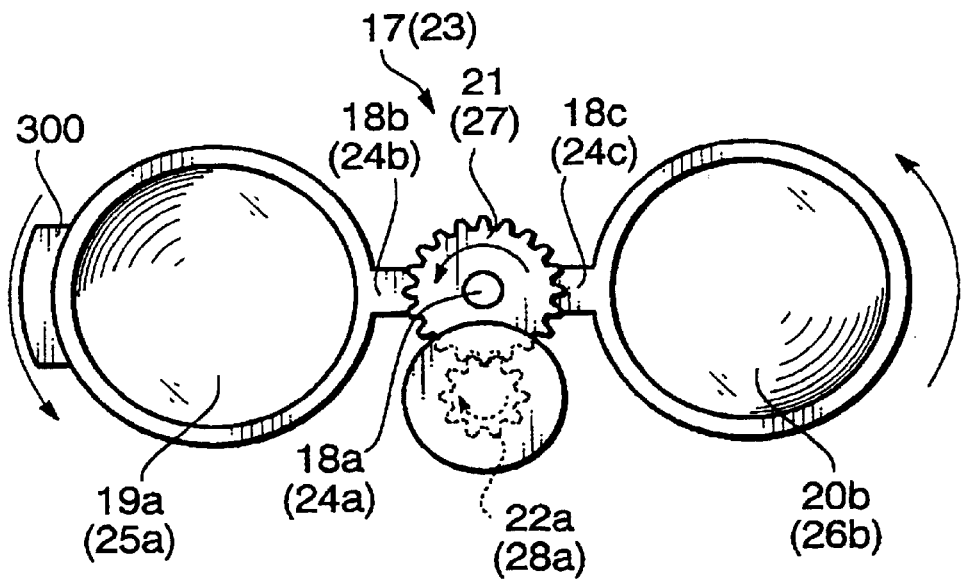
FIG. 12B is a front view similar to FIG. 2B and the balancer is added to the mechanism.

In the first embodiment, even if the lensees 19a and 20b do not have the same weight, the motor 22 is not required to have large torque. However, it is possible to modify the mechanism so that the arm 18 (24) is substantially equally balanced at the shaft 18a (24a) by providing a balancer 300 on the lens holding frame which holds the lighter lens, as shown in FIGS. 12A and 12B.

Second Embodiment

Figure 4:
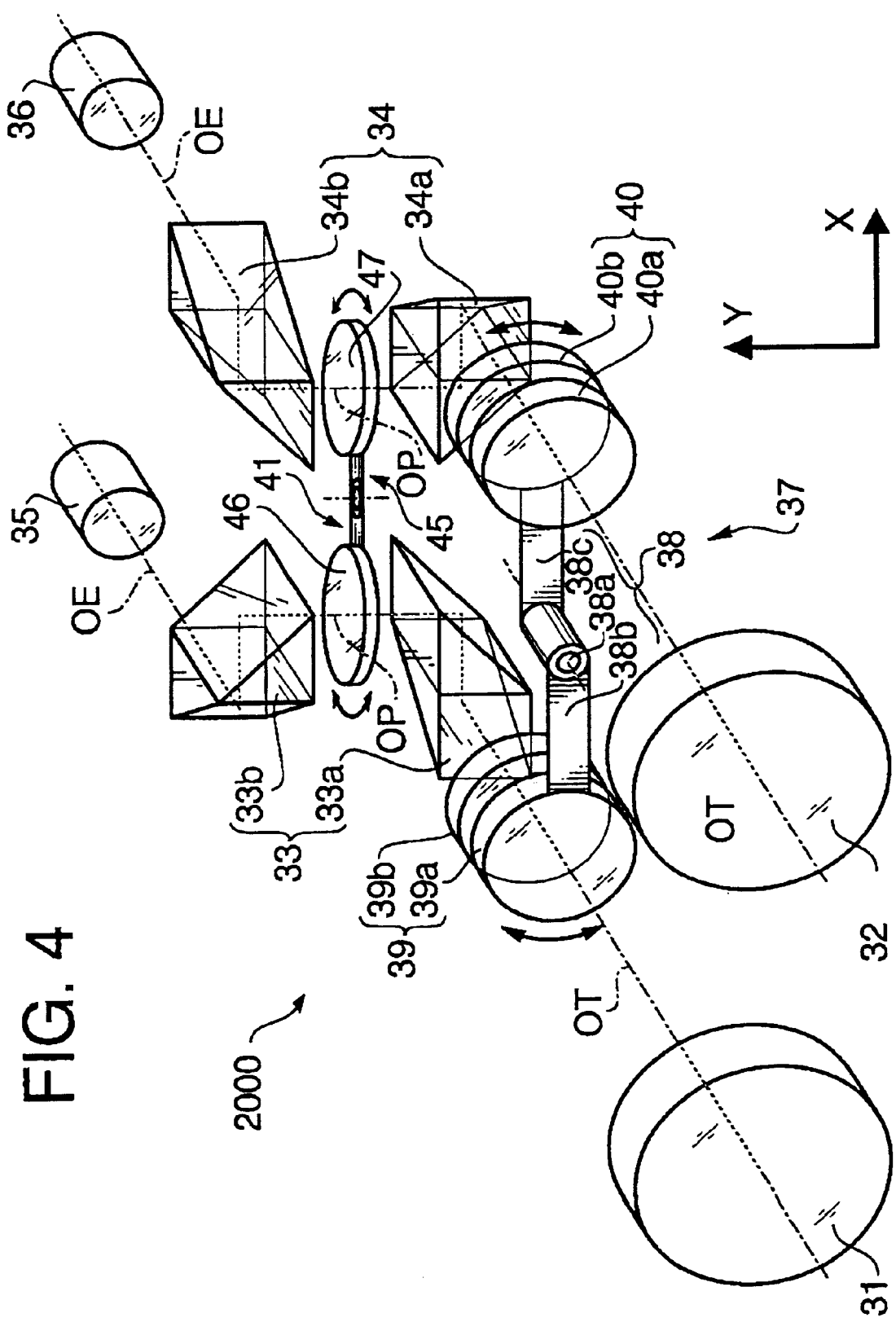
FIG. 4 is a perspective view showing arrangement of optical elements of a binocular according to a second embodiment of the invention.
Figure 5:
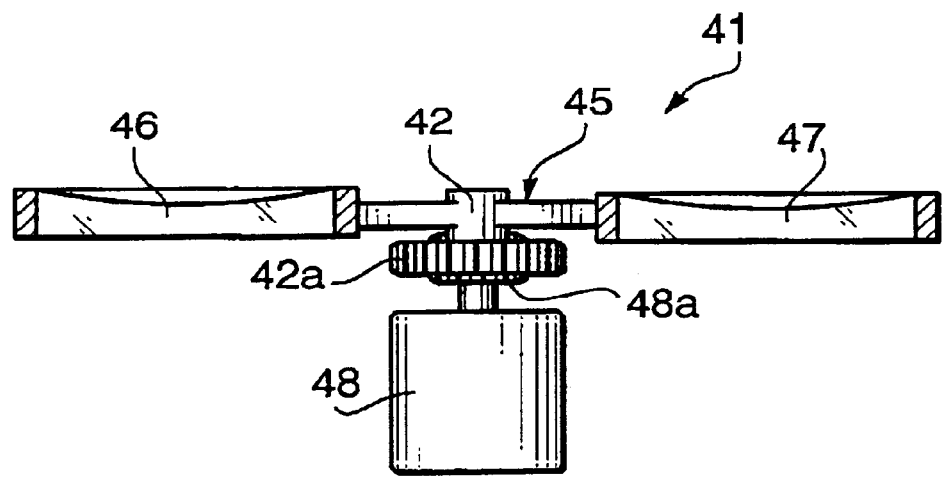
FIG. 5 shows a schematic structure of a right/left compensation mechanism employed in the binocular shown in FIG. 4.

FIG. 4 is a perspective view of an arrangement of optical elements of a binocular 2000 according to a second embodiment of the invention. FIG. 5 is a side view of a right/left hand vibration compensation mechanism 41 employed in the binocular 2000 according to the second embodiment.

As shown in FIG. 4, the binocular 2000 includes right and left objective lenses 31 and 32, right and left erecting optical systems 33 and 34, and right and left eyepiece lenses 35 and 36.

The erecting optical system 33, which is a type II Porro prism, for right eye is divided into first and second sub prisms 33a and 33b; and the erecting optical system 34, which is also the type II Porro prism, for left eye is also divided into first and second sub prisms 34a and 34b.

Similar to the first embodiment, an optical axis of the right (or left) eye telescopic optical system includes an optical axis OT which extends from the objective lens 31 (or 32) to the erecting optical system 33 (or 34), and optical axis OP defined between the first and second sub prisms 33a and 33b (or 34a and 34b), and an optical axis OE which extends from the erecting optical system 33 (or 34) to the eyepiece lens 35 (or 36). The axes OT and OE are parallel to each other, and the axis OP is perpendicular to the axes OT and OE.

On the optical axis OT, i.e., between the objective lens 31 (or 32) and the erecting optical system 33 (or 34), an image Ia (or Ib) of the object is reversed as shown in FIG. 9.

Figure 11:
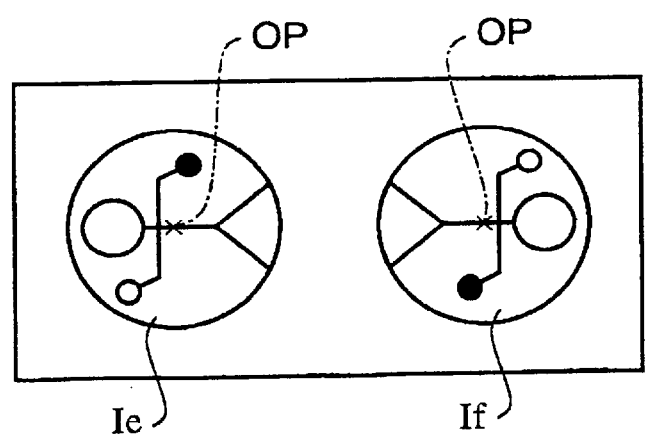
FIG. 11 shows another example of orientation of the images at a position between the first and second sub prisms.

The erecting optical system 33 is similar to the erecting optical system 13 employed in the first embodiment. That is, on the optical axis OP, i.e., between the first and second sub prisms 33a and 33b, an image Ie which is rotated by 90 degrees with respect to the image Ia is formed (rotated) by the first sub prism 33a as shown in FIG. 11. By the second sub prism 33b, the image is erected, which is observed through the eyepiece lens 35.

The erecting optical systems 33 and 34 are arranged symmetrically with respect to a plane at the center of the optical axes OT and OP, and parallel to the optical axes OT and OP. Therefore, on the optical axis OP, i.e., between the first and second sub prisms 34a and 34b, an image, which is rotated by −90 degrees with respect to the image Ib, is formed by the first sub prism 34a as shown in FIG. 11. By the second sub prism 34b, the image is erected, which is observed through the eyepiece lens 36.

Between the objective lenses 31 and 32, and the first sub prisms 33a and 34a, an up/down hand vibration compensation mechanism 37 is provided. The up/down compensation mechanism 37 is similar to the up/down compensation mechanism 17 employed in the first embodiment.

The up/down compensation mechanism 37 includes a rotatable arm 38 which holds the right and left compensation lenses. The shaft 38a of the rotatable arm 38 is located at the center of the both of the optical axes OT of the right and left telescopic optical systems, and extends in parallel to the optical axes OT. In the direction perpendicular to the shaft 38a (i.e., in the X-axis direction in FIG. 4), a right compensation lens frame 38b and a left compensation lens frame 38c extend in opposite directions. The right and left compensation lenses 39 and 40 are arranged such that the optical axes OT intersect the right and left compensation lenses 39 and 40. Similar to the first embodiment, a right compensation lens frame holds a negative lens 39a, and a left compensation lens frame holds a positive lens 40b.

The negative lenses 39a and 40a are the same lenses, and the positive lenses 39b and 40b are the same lenses. Further, the lenses 39a and 40b are formed such that, when these lenses are decentered (i.e., the optical axis of the lenses 39a and 40b are moved in a direction perpendicular to the optical axes OT), the optical paths of light passed through the lenses 39a and 40b shift by the same amount but in the opposite directions. The positive lens 39b and the negative lens 40a, which are not held by the rotatable arm 38, are arranged such that the optical axes thereof coincide with the optical axes OT, respectively.

Similar to the compensation mechanism 17 of the first embodiment, by rotating the arm 38, the negative lens 39a and the positive lens 40b are displaced in opposite directions within a plane perpendicular to the optical axes OT and OT of the telescopic optical systems.

Figure 6:
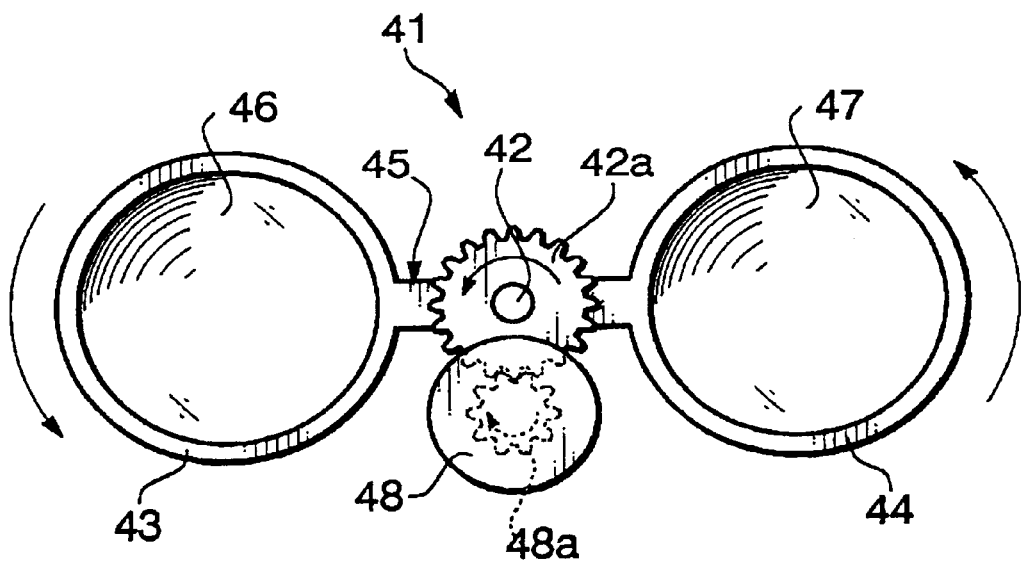
FIG. 6 shows a schematic structure of the right/left compensation mechanism employed in the binocular shown in FIG. 4.

Between the first sub prisms 33a and 40a, and the second sub prisms 33b and 40b, a right/left compensation mechanism 41 is provided. The right/left compensation mechanism 41 includes a rotatable arm 45. The rotatable arm 45 holds right and left compensation lenses 46 and 47. The arm 45 is rotatable about a shaft 42 (see FIGS. 5 and 6). The shaft 42 of the rotatable arm 45 is located at the center of the both of the optical axes OP of the right and left telescopic optical systems, and extends in parallel to the optical axes OP. In the direction perpendicular to a plane which includes the optical axes OT, i.e., in the Y-axis direction in FIG. 4, a right compensation lens frame 43 and a left compensation lens frame 44 extend in opposite directions along X axis. The right and left compensation lenses 46 and 47 are held by the lens frames 43 and 44, respectively. As shown in FIGS. 5 and 6, the compensation lenses 46 and 47 are negative lenses having the same power and the same weight. Thus, when the lenses 46 and 47 are moved in opposite directions, the optical paths of light passed through the lenses 46 and 47 are shifted in the opposite directions, but by the same amount.

To the shaft 42, a driving gear 42a is secured, with which a pinion gear 48a of a motor 48 is engaged. The motor 48 is driven to rotate in either direction such that the pinion gear 48a is rotated in a forward or reverse direction. As shown in FIG. 6, when the pinion gear 48a is rotated in the clockwise direction in the drawing, the arm 45 is driven to rotate in the counterclockwise direction about the rotation shaft 42 via the driving gear 42a. When the pinion gear 48a is rotated in the counterclockwise direction in the drawing, the arm 45 is rotated in the clockwise direction.

As described above, by rotating the arm 45 with the motor 48, the negative lenses 46 and 47 are moved in opposite directions within a plane which is perpendicular to the optical axes OP, and parallel to a plane including the optical axes OT of the telescopic optical systems. Since the negative lenses 46 and 47 move along an arc whose center is the rotation axis of the shaft 42, when displaced, the negative lenses 46 and 47 are displaced in the right/left direction (i.e., in the X-axis direction in FIG. 4) as well as in the up/down direction (i.e., in the direction perpendicular to the X and Y axes). However, the amount of displacement in the X-axis direction is small and can be ignored. Thus, the negative lenses 46 and 47 are moved mainly in the Y-axis direction when the rotatable arm 45 is rotated.

It should be noted that when the rotatable arm 45 is rotated, the negative lenses 46 and 47 are moved in the opposite directions with respect to the reversed images Ia and Ib. Since the images Ie and If at the position between the first sub prisms 33a and 34a, and the second sub prisms 33b and 34b have been rotated with respect to the reversed images Ia and Ib by 90 degrees in the opposite directions, by rotating the arm 45, i.e., by moving the negative lenses 46 and 47 in the opposite directions, the imaged Ie and If are shifted in the same direction when viewed through the eyepiece lenses 35 and 36. Thus, by rotating the arm 45, trembling of the images due to the hand vibration in the right/left direction can be compensated.

It should be noted that the lenses 46 and 47 could be positive lenses having the same power.

In the second embodiment, a control system similar to that shown in FIG. 3 or any other suitable control systems including the hand-vibration sensor and the position sensor for detecting the position of the frame 38 can be used. Since the control system has been described above with reference to FIG. 3, description and drawing of the control system applicable to the second embodiment will be omitted.

Thus, each of the up/down compensation mechanism 37 and the right/left compensation mechanism 41 do not require a motor having a relatively great torque for resisting the gravity force. Since the torque of the motor can be made small, power consumption of such a motor is relatively small, and therefore a battery for supplying power to the motor can also be made small. Further, since the erecting optical systems 33 and 34 are arranged symmetrically so that the images Ie and If are rotated in opposite directions, it becomes possible to use the same kind of lens as compensation lenses 46 and 47. Since the same lens can be used as the compensation lenses 46 and 47, the structure of the right/left compensation mechanism can be made simple.

Modifications

Figure 7:
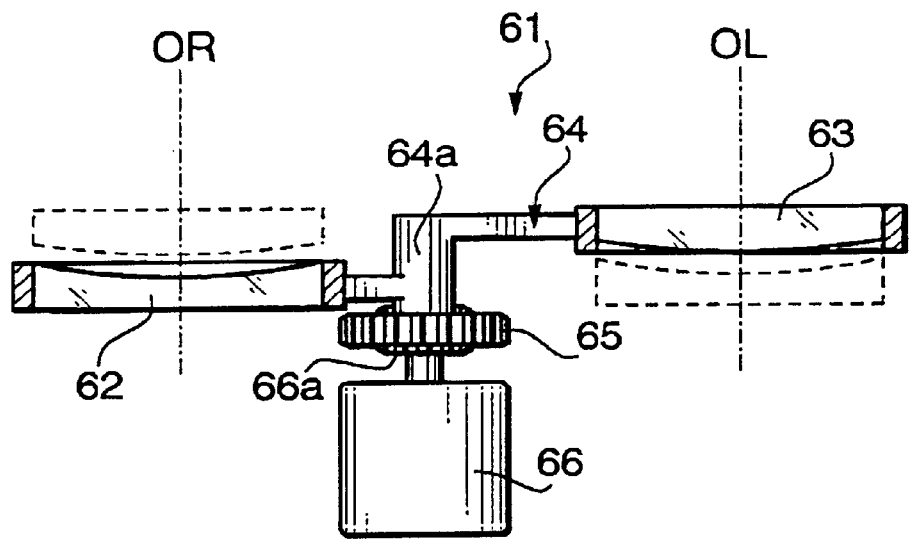
FIG. 7 is a top view showing a schematic structure of a modified hand-vibration compensation mechanism.
Figure 8:
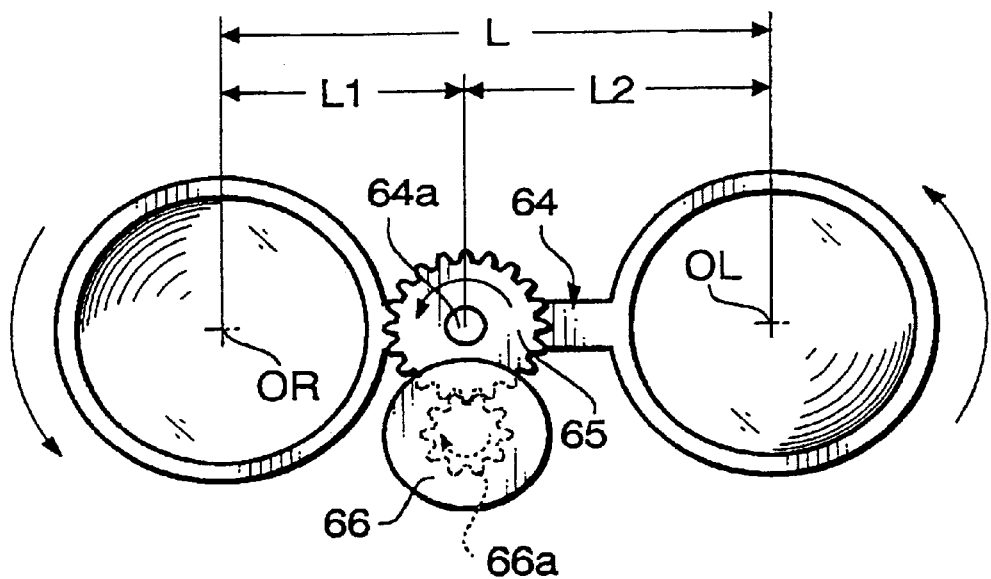
FIG. 8 is a front view showing a schematic structure of the modified hand-vibration compensation mechanism shown in FIG. 7.

In the above-described embodiments, a pair of lenses which are moved in the opposite directions have powers such that the images are shifted by the same amount and in the opposite directions, when the pair of lenses are moved by the same amount. FIGS. 7 and 8 show a modified compensation mechanism 61 which is a modification of the mechanisms 17, 23 (shown in FIGS. 2A and 2B) or the mechanism 37 (shown in FIG. 4). The compensation mechanism 61 may be employed in place of the compensation mechanisms 17, 23 and/or 37 described above. The compensation mechanism 61 includes a negative lens 62 and a positive lens 63, optical axes of which coincide with the optical axes OT (OP) and OT (OP), respectively, when a rotatable arm 64 is located at its neutral position. In this example, it is assumed that when the lenses 62 and 63 are moved in the opposite directions, by the same amount, images are shifted by K1 and K2, respectively, where, for example, K1:K2=−1.44:1.

Figure 14:
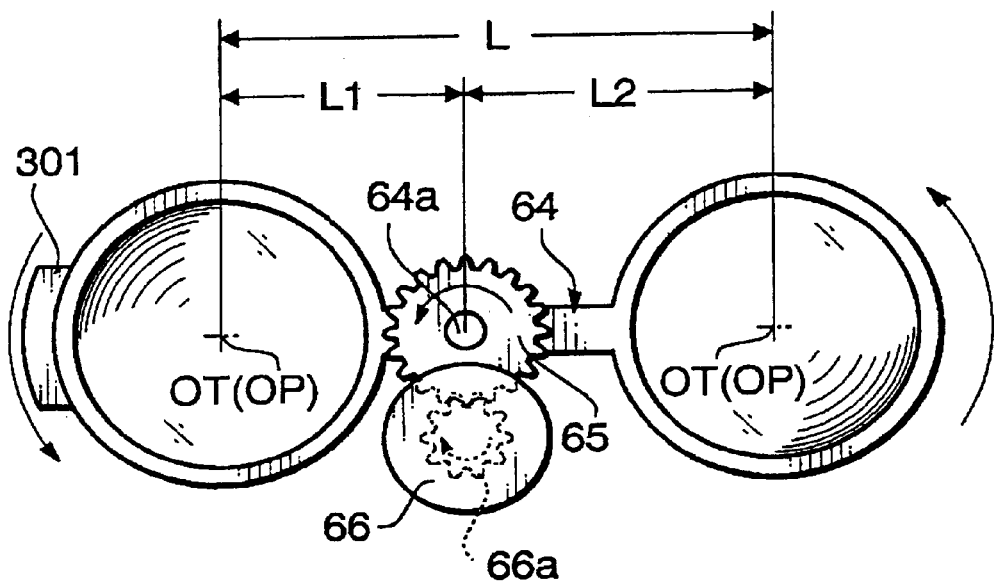
FIG. 14 shows another view of the hand-vibration compensation mechanism shown in FIG. 13.

In order to make the shifting amount of the images equal, moving amounts of the lenses are determined to be inversely proportional to a ratio of shifting amounts of the images. Thus, as shown in FIG. 14, a length L1 between the center of the negative lens 62 and the axis 64a of the rotation, and a length L2 between the center of the positive lens 63 and the axis 64a are determined such that L1:L2=1:1.44. That is, the distance L between the optical axes OT(OP) and OT (OP) is divided to satisfy the above condition. In other words, the following condition is to be satisfied:

$$|K1/K2|=|L2/L1|.$$

With this structure, when a motor 66 is driven in accordance with the hand-vibration applied to the binocular, the arm 64 is rotated, through a pinion gear 66a and a gear 65, to move the lenses 62 and 63 so that the images are shifted by the same amounts. Accordingly, the trembling of images can be compensated with use of the modified compensation mechanism 61. It should be noted that, if the amounts of movement of the lenses 62 and 63 are represented by D1 and D2, the following condition is satisfied.

$$K1/K2=D2/D1$$

Figure 13:
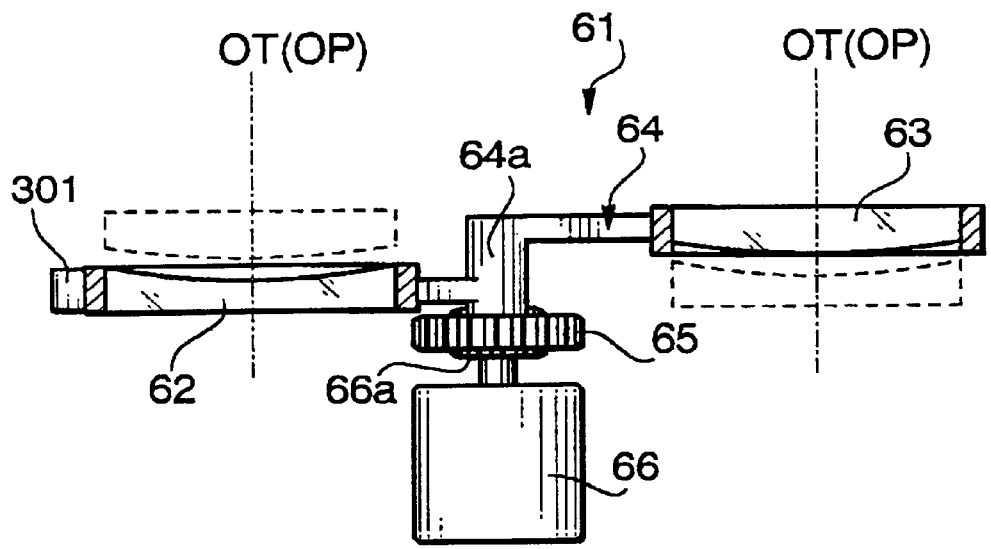
FIG. 13 shows a schematic structure of a mechanism similar to that shown in FIG. 7 and balancer is added.

It should be noted that, in the above modification, since the arm 64 rotates about the axis 64a at which the arm 64 may riot be equally balanced. However, the difference of the weights of the lenses 62 and 63 is generally very small, and accordingly, this structure may not require the motor 66 to have large torque. However, by providing a balancer 301 on a lighter side of the arm 64 as shown in FIGS. 13 and 14, the arm 64 can be made equally-balanced at the axis 64a, and the well-balanced condition can be obtained.

As described above, according to the present invention, the compensation mechanism includes an arm which is rotatable about a rotation axis extending in parallel with the optical axes of the right and left telescopic optical systems. At least one optical element (e.g., a lens) of each of right and left compensation optical systems is held at each end of the arm. It should be noted that the arm is substantially equally balanced at the rotation axis.

In particular, if the shifting amount of the image when the optical element included in the right compensation lens group is moved by a predetermined amount is represented by K1, and if the shifting amount of the image when the optical element included in the left compensation lens group is moved by the same predetermined amount is represented by K2, a distance L1 between a center of said at least one optical element of said first compensation optical system and said rotation axis, and a distance L2 between a center of said at least one optical element of said second compensation optical system and said rotation axis satisfy a relationship:

$|K1/K2|=|L2/L1|.$

When the above relationship is satisfied, the optical elements of the right and left compensation lens groups moves by amounts D1 and D2, respectively. It should be noted that the following relationship is satisfied.

$|L1/L2|=|D1/D2|.$

If K1 equals to K2, then the rotation axis must be located at the center between the optical axes of the telescopic optical systems. In this case, if the weight of the optical elements held at the ends of the arm are substantially the same, no balancer is required. However, if the weight of the optical elements are different, it is preferable that a balancer is provided on the lighter side of the arm.

On the other hand, if K1 is not equal to K2, the rotation axis must be located at a position which satisfies the above-described condition. In this case, if the arm is substantially equally balanced at the rotation axis, no balancer is necessary. However, if the arm is not equally balanced at the rotation axis, it is preferable that a balancer is provided on the lighter side of the arm.

The present disclosure relates to the subject matter contained in Japanese Patent Application No. HEI 09-331738, filed on Dec. 2, 1997, which is expressly incorporated herein by reference in its entirety.

What is claimed is:

1. A binocular having a hand-vibration compensation system for compensating trembling of images due to a hand-vibration applied to said binocular, said binocular comprising:

a pair of telescopic optical systems;

first and second compensation optical systems respectively provided in said pair of telescopic optical systems, optical axes of said pair of telescopic optical systems intersect said first and second compensation optical systems, respectively; and an arm rotatable about a rotation axis extending in parallel with said optical axes of said pair of telescopic optical systems, at least one optical element included in each of said first and second compensation optical systems being held at each end of said arm, said rotation axis being located between said optical axes of said pair of telescopic optical systems, said arm being substantially equally balanced at said rotation axis; and an actuator that drives said arm to rotate about said rotation axis in accordance with a hand-vibration applied to said binocular.

2. The binocular according to claim 1, wherein, when said at least one optical element included in said first compensation optical system is moved by a predetermined amount, image is shifted by an amount K1, and when said at least one optical element included in said second compensation optical system is moved by said predetermined amount, image is shifted by an amount K2, and wherein a distance L1 between a center of said at least one optical element of said first compensation optical system and said rotation axis, and a distance L2 between a center of said at least one optical element of said second compensation optical system and said rotation axis satisfy a relationship:

$|K1/K2|=|L2/L1|.$

3. The binocular according to claim 2, wherein said amount K1 is equal to said amount K2, and wherein said at least one optical element of each of said first and second compensation optical systems has the same weight.

4. The binocular according to claim 2, wherein said amount K1 is equal to said amount K2, wherein a weight of said at least one optical element of each of said first compensation optical system is different from that of said second compensation optical system, and wherein said arm member is provided with a balancer for making said arm member to be substantially equally balanced at said rotation axis.

5. The binocular according to claim 2, wherein said amount K1 is different from said amount K2.

6. The binocular according to claim 5, wherein said arm member is provided with a balancer so that said arm member is substantially equally balanced at said rotation axis.

* * * * *